March 8, 1949.      L. J. GOETTISHEIM      2,464,129
ELECTROMAGNETIC CLUTCH AND BRAKE DEVICE
Filed July 1, 1946
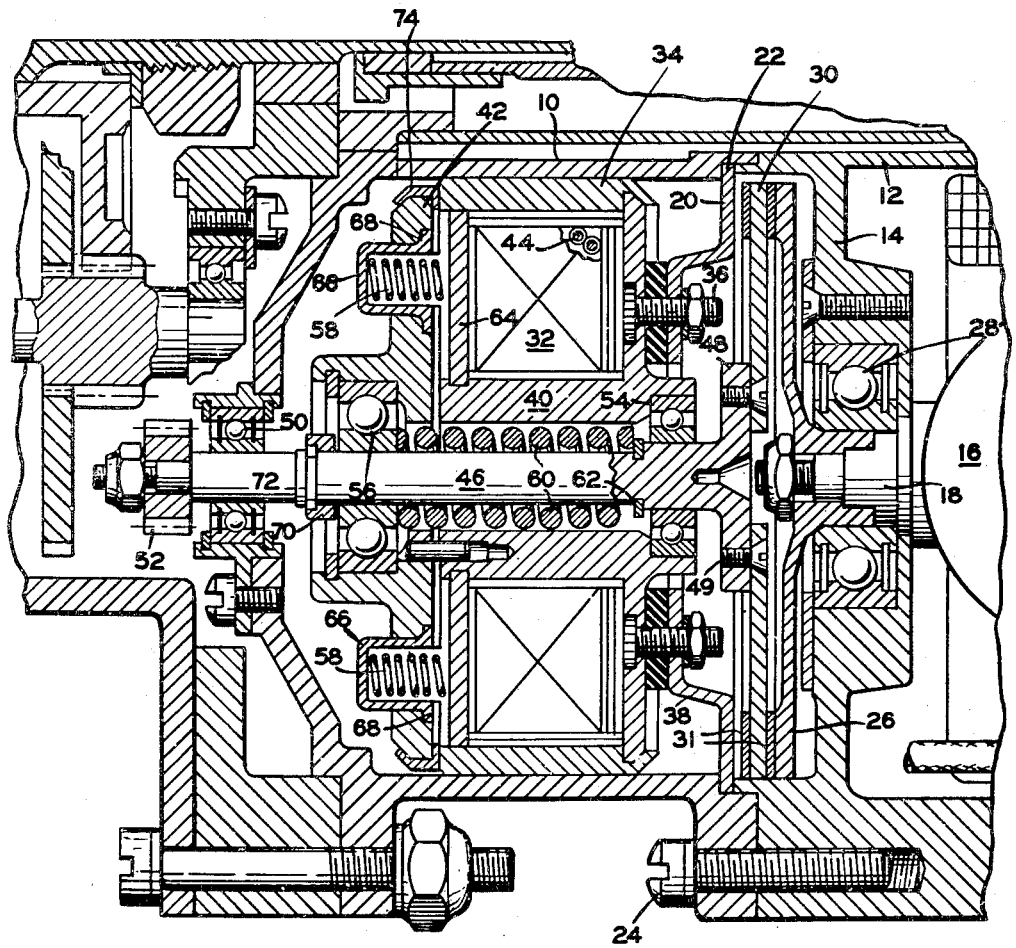
INVENTOR
LAWRENCE J. GOETTISHEIM
BY 
ATTORNEY Patented Mar. 8, 1949

2,464,129

UNITED STATES PATENT OFFICE 2,464,129

ELECTROMAGNETIC CLUTCH AND BRAKE DEVICE

Lawrence J. Goettisheim, New York, N. Y., assignor to Bendix Aviation Corporation, Teterboro, N. J., a corporation of Delaware Application July 1, 1946, Serial No. 680,765

4 Claims. (Cl. 192—18)

1

This invention relates to clutch and brake units, and particularly to units of this character adapted for employment in actuators for operating members, such as tabs, flaps, and other elements of airplanes.

It is imperative, in certain applications, that such elements be stopped quickly, at any point on the path of movement thereof, for accurate positioning, and that an actuator should be capable of effecting this result, and be as compact and light in weight as possible.

Objections to prior actuators reside in the use of clutches, in which a clutch member is actuated and held by the flux of an electromagnet whereby, by reason of variable voltage, the clutch is not adapted as means for accurately limiting the torque.

It has heretofore been suggested, in instances of simultaneous like operation of certain elements by separate actuators, to provide means whereby when the motor of either of two actuators fails, the motor of the other actuator will operate both actuators.

Among the objects of the present invention are to overcome the above-mentioned adverse features of the former devices indicated, and to do so by novel and effective means.

Another object is to provide a unit of the above-indicated character including novel driving, driven, brake, and clutch members, electromagnetic operating means, and other elements in novel combination whereby the driven member may be alternately connected to the brake and driving members in extremely short periods of time, as on the order of one-fiftieth of a second.

Another object is to provide the above-mentioned combination in a unit of smaller size and lighter weight than similar former units.

Another object is to provide a unit as aforesaid in which the elements are operated by electromagnetic means substantially free from flux lag and voltage changes of such means.

Another object of the invention is to provide clutch and brake units that are particularly well adapted for operation in actuators of the above-mentioned instance wherein, if the motor of one actuator fails, the other performs the duty of both.

Another object of the invention is to provide a unit of the above-indicated character that is simple and durable in construction, economical to manufacture, and effective in its operation.

These and other objects and features of the invention are pointed out in the following description in terms of the embodiment thereof which is shown in the accompanying drawing. It is to be understood, however, that the drawing is for the purpose of illustration only, and is not designed as a definition of the limits of the invention, reference being had to the appended claims for this purpose.

In the drawing the single figure is an enlarged detail view, partially in side elevation and partially in section, of a portion of an actuator, and showing a unit of the invention as adapted to such actuator.

Referring to the drawing, the structure therein shown comprises a pair of adjoining housing portions 10 and 12, a partition 14, adjacent to the juncture of the housings, forming, in this instance, a portion of the housing portion 12, which, as shown, is a portion of a housing of a reversible motor 16, at one side of the partition 14, having an armature shaft 18 journaled in the partition. A non-rotative, axially fixed brake 20, at the other side of the partition 14, has an outer perimetral portion 22 clamped, between interfitting rabbet groove like portions of the housing portions 10 and 12, as by screws 24, which hold the housing portions together. An axially fixed rotative driving disc 26, at the side of the partition opposite to that at which the motor 16 is disposed, is connected to the armature shaft in an anti-friction bearing 28 in the partition 14.

A rotative and axially movable clutch disc 30, disposed between the driving disc 26 and the brake 20, is provided with friction facing elements 31 at opposite sides, and is adapted to alternately engage the driving disc 26 and the brake 20 through the intermediary of the friction facing elements 31.

Electromagnetic means 32, in the housing portion 10, includes an annular casing or core 34 of axial substantially E-section, as shown, fixed at its back, as by screw bolts 36, to a cupped portion 38 of the brake 20, and having a hollow middle core leg 40. An axially movable non-rotative armature disc 42 is disposed opposite the pole ends of the core 34, and a coil winding 44, which in this instance is connected to the motor 16 for simultaneous energization and de-energization therewith, surrounds the hollow middle core leg 40.

A driven shaft 46, having an end flange 48 by which it is fixed to the clutch disc 30, as through the medium of screws 49, extends from the disc 30, through the hollow leg 40, the armature disc 42 and a ball-bearing 50, to a pinion 52 fixed to the shaft and constituting the input gear of a gear reducing train for operating, in this instance, elements not shown, but including a screw shaft for operating relatively movable elements, such as the airplane elements above set forth. The shaft 46 is journaled to the casing 34, as by an anti-friction bearing 54, and to the armature disc 42, as by a similar bearing 56.

Means, such as springs 58, bias the armature disc 42 away from the core 40 with a predetermined braking force.

A diamagnetic plate 64 maintains the coil 44 in place, and the springs 58, which are encased in cups 66 held to the armature disc 42, as by flanges 68 on the cups, are compressed between the plate 64 and the outer bottom ends of the cups.

The position, axially of the armature disc 42 with respect to any relative movement of the driven or clutch disc 30, is maintained by a sleeve 70 and a snap ring 72. The sleeve 70 presses axially against the bearing 56 which, in turn, is backed by a spring 60 retained by a lock ring 62. The arrangement of parts gives a preloaded status to the relative positions of the armature disc 42 and the driven disc 30. Any excessive magnetic pull will cause an increased compressive force in the high rate spring 60 and tend to give an instant and maximum driving effort, as induced by the magnetic force, through the medium of the magnetic pull and the friction facing 31.

The ring 74, shown in this instance as on the disc 42, but which may be on the core 34, on the housing portion 10 or otherwise disposed, is adapted to provide a minimum space or flux gap between the armature disc 42 and the core 34, whereby to take advantage of substantially the maximum magnetic pull on the armature and to insure quick release of the latter under the action of the springs 58.

In operation, with the motor 16 and the coil 44 deenergized, the springs 58 maintain the armature disc 42 away from the core 34, and act through the bearing 56, the sleeve 70, the ring 72 and the shaft 46, to force the clutch disc 30 and its corresponding facing element 31 into engagement with the brake 20. The force with which the springs 58 act, in this instance, is such as to quickly and effectively stop motion of all parts operated by the driven shaft 46 when the latter is disconnected from the driving or motor shaft 18.

However, where the actuator is related to another actuator of like construction that, when either motor fails for any reason, the motor of the other actuator may operate both actuators, the force of the springs 58, of the actuator having the disabled motor, is not sufficient to stop effective operation of the other actuator against the action of the clutch disc 30 on the brake 20 of the actuator having the disabled motor.

Under normal conditions, when the motor 16 and the coil 44 are energized, under which conditions the parts are positioned as shown, the motor or driving shaft 18 rapidly accelerates and, simultaneously with energization of the motor, the clutch disc 30 is disconnected from the brake 20 and connected to the driving disc 26.

In effecting this action, the armature disc 42, which at the start of the action is in its position furthest from the core 34 in its weakest flux field, is therefore initially only required to overcome the weaker springs 58 to disengage the clutch disc 30 from the brake 20, which this weaker flux does effectively. During this initial action, the stronger spring 60 is unyieldingly carried along with the shaft 46, but as the clutch disc 30 separates from the brake 20 and the armature disc 42 reaches a stronger flux field, the pull of the armature by the core is translated into a push or yielding compression of the stronger spring 60 whereby the clutch disc 30 is engaged to the driving disc 26 under force stronger than the combined forces of the springs 58 and 60 as produced by the armature movement.

Although only one embodiment of the invention has been illustrated and described, various changes in the form and relative arrangements of the parts, which will now appear to those skilled in the art, may be made without departing from the scope of the invention. Reference is, therefore, to be had to the appended claims for a definition of the limits of the invention.

What is claimed is:

1. The combination of a pair of adjoining housing portions, a partition adjacent to the juncture thereof, a motor at one side of said partition having an armature shaft journaled therein, an axially fixed non-rotative brake spaced from the other side of said partition clamped between said portions, a rotative axially fixed driving disc at said other side next thereto and connected to said shaft, a rotative clutch disc between and axially movable to alternately engage said driving disc and said brake, electromagnetic means including an annular casing core of axial substantially E-section fixed at its back to said brake and having a hollow middle leg, an axially movable non-rotative armature disc opposite the ends of the core legs at the front of the core, a coil around said middle leg, a driven shaft fixed to said clutch disc extending through said hollow leg and said armature in journaled relation thereto, means biasing said armature axially away from said core with a given force, and means including yieldable means of greater force rendering the latter at first unyieldably movable with said armature and said driven shaft when said coil is energized to disengage said clutch disc from said brake and to subsequently yield under the pull of the core on the armature and with axial movement of the armature relative to the driven shaft to engage said clutch disc to said driving disc.

2. The combination in a plurality of means disposed in relation to each other in the order named, of an axially stationary rotative driving disc at one end of the series, an axially movable rotative driven clutch disc, an axially stationary non-rotative brake, said clutch disc being adapted for alternate opposite axial movements engaging it to one and disengaging it from the other of said brake and said driving disc, and electromagnetic means including a stationary core and having a coil and a non-rotative axially movable armature adjacent to the other end of the series, a driven shaft fixed to said clutch disc and extending through said electromagnetic means to said other end, means biasing said armature away from said core with a given force to engage said clutch disc to said brake free from said driving disc, and means including yieldable means of greater force than said biasing means causing said yieldable means at first to unyieldingly move with axial movement of said armature and said driven shaft when said coil is energized to disengage said clutch disc from said brake and subsequently to yield to continued axial movement of the driven shaft for engagement by the latter of the clutch disc to said driving disc.

3. The combination of an axially stationary rotative driving disc, an axially movable rotative driven clutch disc, an axially stationary non-rotative brake, said clutch disc being adapted for alternate opposite axial movements engaging it to one and disengaging it from the other of said brake and said driving disc, electromagnetic means including a stationary core, a coil for the core and an axially movable armature, a driven shaft fixed to said clutch disc and extending through said electromagnetic means, means biasing said armature away from said core with a given force to engage said clutch disc to said brake free from said driving disc, and means including yieldable means of greater force causing the latter to at first unyieldingly move with axial movement of said armature and said driven shaft when said coil is energized to disengage said clutch disc from said brake and subsequently to yield upon continued axial movement of the armature and the driven shaft for engagement by the latter of the clutch disc to the driving disc.

4. The combination of driving means including a clutch member, driven means including brake and clutch portions, a brake member, said driven means being adapted for movement in one direction engaging the brake portion to the brake member and disengaging the clutch portion from the clutch member and in the opposite direction for disengaging the brake portion from the brake member and engaging the clutch portion to the clutch member, power-operated means including a movable element, means biasing said element to position engaging the brake portion to the brake member under a given force when the power means is deenergized, and means responsive to energization of the power means including yieldable means of greater force than said biasing means causing the latter to unyieldingly move with initial movement of said element disengaging the brake portion from the brake member and subsequently to yield upon continued movement of said element in engaging the clutch portion to the clutch member.

LAWRENCE J. GOETTISHEIM.

REFERENCES CITED

The following references are of record in the file of this patent:

UNITED STATES PATENTS

| Number | Name | Date |
|---|---|---|
| 2,354,854 | Doll | Aug. 1, 1944 |
| 2,401,003 | Lear | May 28, 1946 |